(12) United States Patent
Sierra

(10) Patent No.: US 10,472,053 B2
(45) Date of Patent: Nov. 12, 2019

(54) RETRACTABLE WHEEL ASSEMBLY

(71) Applicant: Luis Sierra, London (CA)

(72) Inventor: Luis Sierra, London (CA)

( * ) Notice: Subject to any disclaimer, the term of this patent is extended or adjusted under 35 U.S.C. 154(b) by 133 days.

(21) Appl. No.: 15/154,906

(22) Filed: May 13, 2016

(65) Prior Publication Data

US 2017/0327207 A1  Nov. 16, 2017

(51) Int. Cl.
*B62D 63/06* (2006.01)
*B64C 25/20* (2006.01)
*B64C 25/12* (2006.01)
*B60G 3/20* (2006.01)

(52) U.S. Cl.
CPC ............... *B64C 25/20* (2013.01); *B60G 3/20* (2013.01); *B62D 63/061* (2013.01); *B62D 63/062* (2013.01); *B64C 25/12* (2013.01); *B60G 2204/47* (2013.01); *B60G 2300/04* (2013.01)

(58) Field of Classification Search
CPC ........... B64C 25/20; B64C 25/12; B60G 3/20; B60G 2300/04; B60G 2204/47; B62D 63/061; B62D 63/062
See application file for complete search history.

(56) References Cited

U.S. PATENT DOCUMENTS

| 1,523,675 A * | 1/1925 | Towle | B64C 25/10 244/102 R |
|---|---|---|---|
| 1,718,169 A | 6/1929 | Baumann | |
| 1,835,368 A | 12/1931 | Bellanca | |
| 2,044,338 A * | 6/1936 | Steward | B64C 25/12 244/102 R |
| 2,467,015 A | 4/1949 | Dreifke | |
| 3,450,415 A | 6/1969 | Martin | |
| 3,575,365 A | 4/1971 | Austin | |
| 5,531,179 A | 7/1996 | Roycroft | |
| 7,322,864 B2 * | 1/2008 | Longdill | B60F 3/0038 440/12.5 |
| 8,696,012 B2 * | 4/2014 | Oyasaeter | B62D 63/061 280/491.1 |
| 10,343,736 B2 * | 7/2019 | Yoder | B62D 61/125 |
| 2006/0186616 A1 * | 8/2006 | Rudiger | B60G 3/14 280/6.15 |
| 2009/0295192 A1 * | 12/2009 | Hyde | B62D 63/061 296/181.7 |

(Continued)

*Primary Examiner* — Erez Gurari

(57) ABSTRACT

A retractable wheel assembly includes arm assemblies, wheels, retraction arms, guide blocks, and a threaded shaft. The arm assemblies are hingedly attached to a lower frame of a utility vehicle. Each arm assembly comprises a first arm, a second arm, and a third arm hingedly linked therebetween. Each wheel is connected to the third arm of each arm assembly. The retraction arm is connected to the second arm, and a threaded shaft. The threaded shaft is configured to be actuated rearwardly where the retraction arm is rearwardly pulled helped by a guide block to convert the longitudinal movement to vertical movement, causing the second arm to fold the arm assembly inwardly when the trailer is positioned at rest. Then the threaded shaft is configured to be actuated forwardly where the retraction arm is pushed forward and helped by a guide block to convert the longitudinal movement to vertical movement causing the second arm to unfold the arm assembly outwardly to deploy the wheels for motion.

8 Claims, 5 Drawing Sheets

(56) References Cited

U.S. PATENT DOCUMENTS

| | | | |
|---|---|---|---|
| 2012/0111999 A1* | 5/2012 | Acks | B64C 25/12 |
| | | | 244/102 A |
| 2014/0077032 A1* | 3/2014 | Ivans | B64C 25/12 |
| | | | 244/102 R |
| 2014/0263832 A1* | 9/2014 | Schmidt | B64C 25/12 |
| | | | 244/102 A |
| 2017/0291654 A1* | 10/2017 | Yoder | B62D 61/125 |
| 2018/0065733 A1* | 3/2018 | Mellor | B64C 25/12 |
| 2018/0162522 A1* | 6/2018 | Luce | B64C 25/22 |
| 2019/0016445 A1* | 1/2019 | Clark | B64C 25/00 |

* cited by examiner

RETRACTABLE WHEEL ASSEMBLY

BACKGROUND

Most modern day vehicles have conventional wheel assemblies that has not undergone any substantial changes in design. In general, according to conventional mechanical practices, the wheels are attached at opposing ends of a drive shaft, suspended by a strut assembly, and separated by, for example, a sway bar. This is the general construction of vehicles. But in the case of selective application of wheels, where wheels were used only when needed, retractable wheel systems were introduced. The best example of such retractable wheels is in aircraft design which requires retractable wheel system for takeoff and landing. The retractable wheel system also finds further application in utility trailers which are used for a dual purpose of containment of load, as well as transport of the load. The transport of the utility trailers require wheels that can be retracted from a slot beneath the chassis of the utility trailers.

Most of the retractable wheel systems used nowadays employ a complex design which uses high strength materials in high quantities, which considerably increase the cost of the overall design of the utility applications. Even aircrafts which use retractable landing gears make use of light weight high strength materials which are expensive to manufacture and design. The accidental folding of landing gears during a landing of the aircraft is also a matter of concern in the design of landing gears. Therefore, there is a need for a retractable wheel system which is simpler in design, cost effective, and will prevent accidental folding of the landing gear during landing operation of an aircraft. There is the need for a retractable wheel system which provide a design where the wheels can be extended to a predefined span which effectively stabilizes the landing of the aircraft, or the movement of the utility vehicle.

Hence, there is a long felt but unresolved need for a retractable wheel assembly which considerably reduces the cost involved in designing and manufacturing, as well as provide a stable solution to prevent the accidental folding of the landing gear during the landing operation of the aircraft.

SUMMARY OF THE INVENTION

The retractable wheel assembly for an aircraft disclosed herein comprises at least two arm assemblies, a pair of wheels, a retraction arm, and the threaded shaft. The arm assemblies are hingedly attached to a lower frame of the aircraft, and symmetrically disposed along the lower frame. Each arm assembly comprises a first arm hingedly connected to the lower frame, a second arm hingedly linked to the first arm, and a third arm hingedly linked to the second arm. Each wheel is hingedly connected at distal ends of the third arm of each arm assembly, and hingedly connected to the lower frame. The retraction arm is hingedly connected to the second arm, and a distal end of the retraction arm in hinged connection with an end of a threaded shaft. Here, the threaded shaft is centrally positioned between the two arm assemblies and perpendicular to the arm assemblies.

The threaded shaft is configured to be actuated in a rearward movement where the retraction arm is rearwardly pulled causing the second arm to unfold the arm assembly outwardly and deploy the wheels for landing of the aircraft. Then, the threaded shaft is configured to be actuated in a forward movement where the retraction arm is pushed forward causing the second arm to fold the arm assembly inwardly and fold the wheels during takeoff of the aircraft.

In an embodiment, the first arm and third arm are spring loaded to thrust the arm assemblies during the folding of the wheels during takeoff, and unfolding of the wheels during landing. In an embodiment, the second arm moves at a higher speed than the first arm and the third arm to fold the first arm and second arm during the takeoff and landing of the aircraft.

In an embodiment, each retraction arm is rigidly held by the threaded shaft during landing of the aircraft, where the retraction arms prevents accidental folding of the arm assemblies connected to the wheels. In an embodiment, the retractable wheel assembly further comprises a guide way defined by a pair of guide blocks centrally positioned between the arm assemblies, where the threaded shaft is configured to traverse in the forward and the backward movement through the guide way. In an embodiment, the guide blocks prevent a sudden impact movement of the arm assemblies during take-off or landing. In an embodiment, the wheels are hingedly connected to the lower frame of the aircraft via a high strength arm frontally positioned to each wheel and a shock absorber arm rearwardly positioned to the wheels, to avoid vibrations of the arm assemblies during operation. In an embodiment, the wheels are configured to be extended across a predefined span via radially extending the arm assembly, wherein the predefined extension of the wheels stabilizes the landing of the aircraft.

DETAILED DESCRIPTION OF THE INVENTION

Figure 1A:
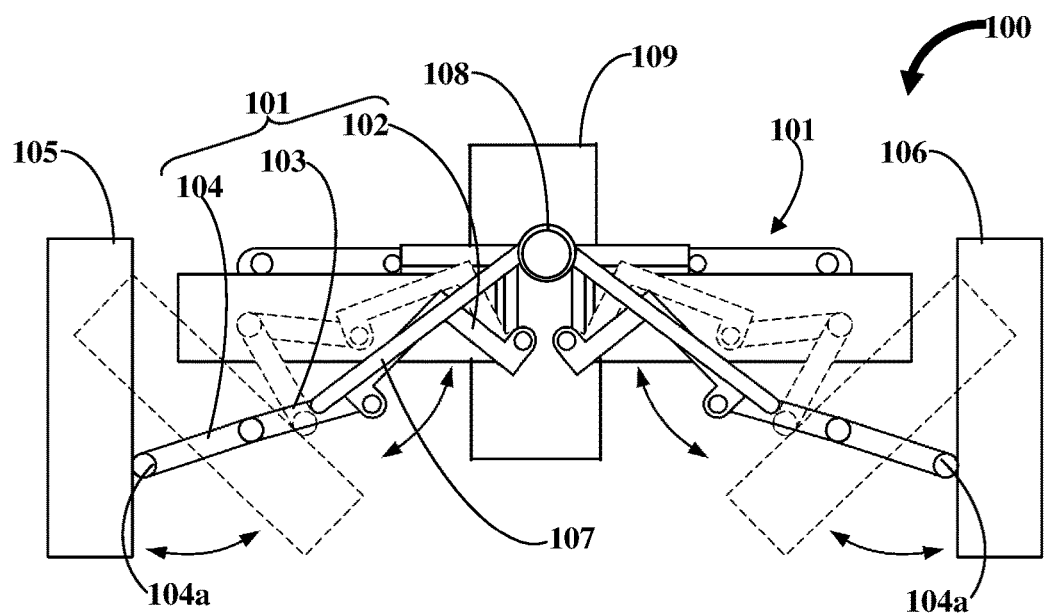
FIG. 1A exemplarily illustrates a rear view of the retractable wheel assembly.
Figure 1B:
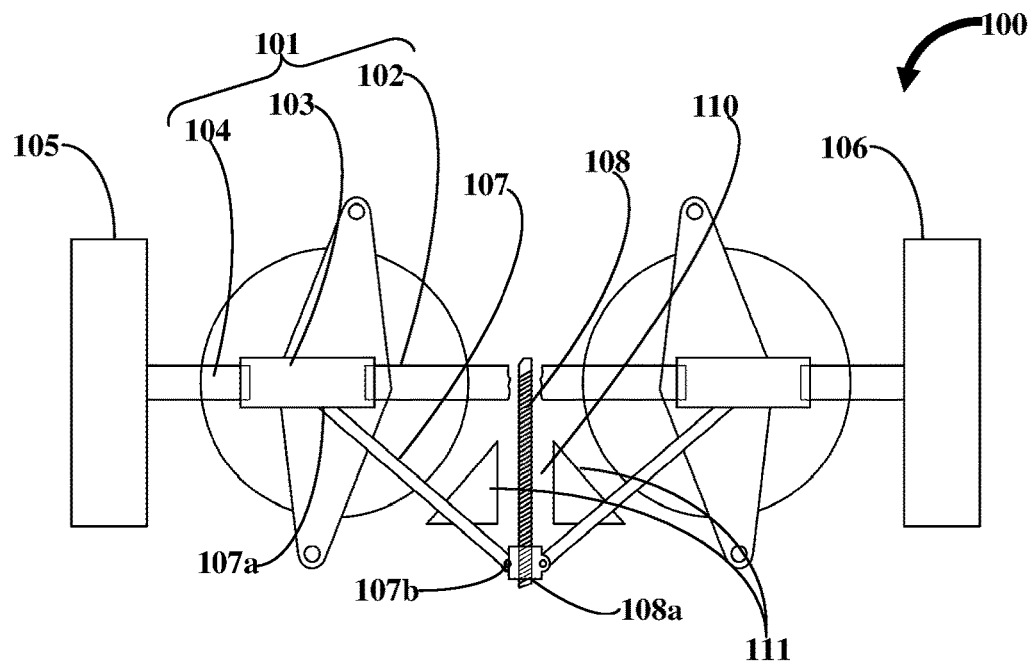
FIG. 1B exemplarily illustrates a top view of the retractable wheel assembly.

With reference to FIGS. 1A-1B, the retractable wheel assembly 100 disclosed herein comprises at least two arm assemblies 101, a pair of wheels 105 and 106, a retraction arm 107, and the threaded shaft 108. The arm assemblies 101 are hingedly attached to a lower frame 109 of a utility vehicle, and symmetrically disposed along the lower frame 109. Each arm assembly 101 comprises a first arm 102 hingedly connected to the lower frame 109, a second arm 103 hingedly linked to the first arm 102, and a third arm 104 hingedly linked to the second arm 103. Each wheel is hingedly connected at distal ends 104a, as shown in FIG. 1A, of the third arm 104 of each arm assembly 101, and hingedly connected to the lower frame 109. One end 107a of the retraction arm 107 is hingedly connected to the second arm 103, and a distal end 107b of the retraction arm 107 in hinged connection with an end 108a of a threaded shaft 108. Here, the threaded shaft 108 is centrally positioned between the two arm assemblies 101 and perpendicular to the arm assemblies 101.

The threaded shaft 108 is configured to be actuated in a rearward movement where the retraction arm 107 is rearwardly pulled causing the second arm 103 to unfold the arm assembly 101 outwardly and deploy the wheels 105 and 106 for motion of the utility vehicle. Then, the threaded shaft 108 is configured to be actuated in a forward movement where the retraction arm 107 is pushed forward causing the second arm 103 to fold the arm assembly 101 inwardly and fold the wheels 105 and 106 when the utility vehicle is positioned at rest. The description is written based on an aircraft as the 'utility vehicle', but the scope of the description does not limit the utility vehicle to aircrafts alone, but any other utility vehicle which require a retractable wheel assembly 100, for example, utility trailers, utility containers, etc.

FIG. 1A exemplarily illustrates a rear view of a retractable wheel assembly 100, and FIG. 1B exemplarily illustrates a top view of the retractable wheel assembly 100. The retractable wheel assembly 100 for an aircraft disclosed herein comprises at least two arm assemblies 101, a pair of wheels 105 and 106, a retraction arm 107, and the threaded shaft 108. The arm assemblies 101 are hingedly attached to a lower frame 109 of the aircraft, and symmetrically disposed along the lower frame 109. Each arm assembly 101 comprises a first arm 102 hingedly connected to the lower frame 109, a second arm 103 hingedly linked to the first arm 102, and a third arm 104 hingedly linked to the second arm 103. Each wheel is hingedly connected at distal ends 104a, as shown in FIG. 1A, of the third arm 104 of each arm assembly 101, and hingedly connected to the lower frame 109. One end 107a of the retraction arm 107 is hingedly connected to the second arm 103, and a distal end 107b of the retraction arm 107 in hinged connection with an end 108a of a threaded shaft 108. Here, the threaded shaft 108 is centrally positioned between the two arm assemblies 101 and perpendicular to the arm assemblies 101.

The threaded shaft 108 is configured to be actuated in a rearward movement where the retraction arm 107 is rearwardly pulled causing the second arm 103 to unfold the arm assembly 101 outwardly and deploy the wheels 105 and 106 for landing of the aircraft. Then, the threaded shaft 108 is configured to be actuated in a forward movement where the retraction arm 107 is pushed forward causing the second arm 103 to fold the arm assembly 101 inwardly and fold the wheels 105 and 106 during takeoff of the aircraft. In an embodiment, the first arm 102 and third arm 104 are spring loaded to thrust the arm assemblies 101 during the folding of the wheels 105 and 106 during takeoff, and unfolding of the wheels 105 and 106 during landing. The springs used to load the first arm 102 and the second arm 103 are not overly rigid, but just strengthened enough to provide a thrust for the first arm 102 and the second arm 103. In an embodiment, the second arm 103 moves at a higher speed than the first arm 102 and the third arm 104 to fold the first arm 102 and second arm 103 during takeoff and landing of the aircraft.

In an embodiment, each retraction arm 107 is rigidly held by the threaded shaft 108 during landing of the aircraft, where the retraction arms 107 prevents accidental folding of the arm assemblies 101 connected to the wheels 105 and 106. Here the retraction arms 107 and the threaded shaft 108 form an angle and are stabilized at the landing position, whereby the retractable wheel assembly 100 is prevented from failing via accidental folding of the wheels 105 and 106. In an embodiment, the retractable wheel assembly 100 further comprises a guide way 110 defined by a pair of guide blocks 111 centrally positioned between the arm assemblies 101, where the threaded shaft 108 is configured to traverse in the forward and the backward movement through the guide way 110. In an embodiment, the guide blocks 110 prevent a sudden impact movement of the arm assemblies 101 during take-off or landing.

In an embodiment, the wheels 105 and 106 are configured to be extended across a predefined span via radially extending the arm assembly 101, wherein the predefined extension of the wheels 105 and 106 stabilize the landing of the aircraft. The guide blocks 111 are positioned at constant predefined angles, to further prevent any accidental retraction of the retraction arm 107 during landing. The retraction arm 107 does not change the angle in respect to the threaded shaft 108 to extend or retract the wheels 105 and 106, whereas the retraction arm 107 driven by the retraction arm 107 moves forward and backward along the guide way 111, causing a vertical movement in the second arm 103. In an example, in the case of design of a retractable wheel assembly 100 for a utility trailer, the threaded shaft 108 can be obtained from a regular car jack.

Figure 2:
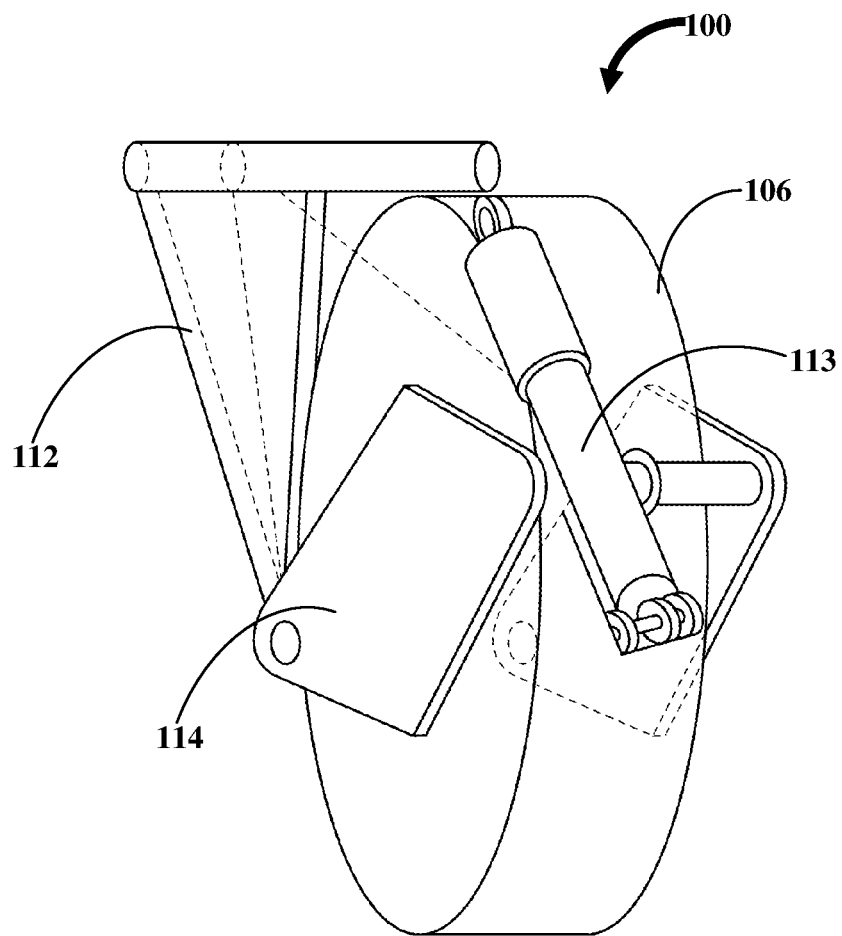
FIG. 2 exemplarily illustrates a rear perspective view of the right wheel of the retractable wheel assembly.

FIG. 2 exemplarily illustrates a rear perspective view of the right wheel 106 of the retractable wheel assembly 100. In an embodiment, the retractable wheel assembly 100 is further configured to be attached to the lower chassis of utility vehicles which require retractable wheels 105 and 106, for example, right wheel 106 as shown in FIG. 2. Therefore, the retractable wheel assembly 100 for utility vehicles is configured to fit in a predefined space of, for example, about 120 cms (centimeters) wide, 80 cms long, and 20 cms high. The size of the entire retractable wheel assembly 100 can also be flexibly varied in the manufacturing unit depending on the usage in different areas. The size described here is of a small size or of a regular size which is selected for utility trailers, and these tires are commercially available for sale in all tires stores. This retractable wheel assembly 100 is designed mainly for every application which needs a low cost landing gear for vehicles with retractable landing gear system. In an embodiment, the wheels 105 and 106 are hingedly connected to the lower frame 109 of the aircraft via a high strength arm 112 frontally positioned to each wheel 106 and a shock absorber arm 113 rearwardly positioned to the wheel 106, to avoid vibrations of the arm assemblies 101 during operation. The high strength arm 112 and the shock absorber arm 113 are connected by a cross bar 114.

Figure 3:
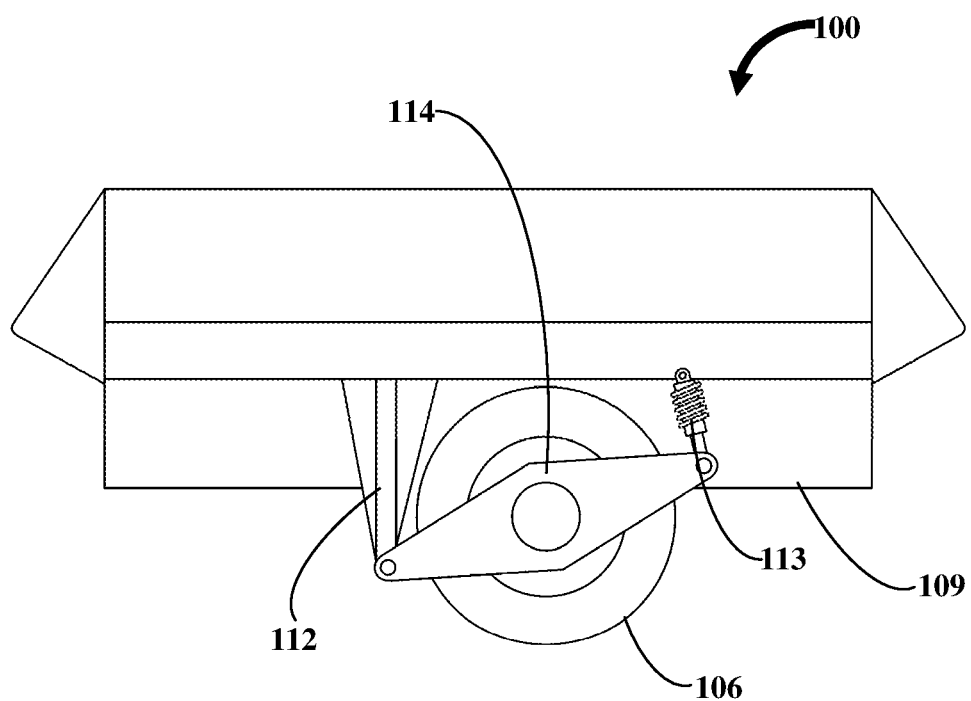
FIG. 3 exemplarily illustrates a side perspective view of the right wheel of the retractable wheel assembly.

FIG. 3 exemplarily illustrates a side perspective view of the right wheel of the retractable wheel assembly 100. Referring to FIG. 2, the positioning of the high strength arm 112 frontally to the wheel 106, and the shock absorber arm 113 rearwardly to the wheel 106, where both high strength arm 112 and shock absorber arm 113 is connected via the cross bar 114, as shown in this side view in FIG. 3. In construction of the assembly of wheels 105 and 106, for example, the tire and hub are assembled into two thick sheet of aluminum or steel, where the arm assembly 101 is connected to the inner sheet of the wheels 105 and 106 to avoid vibrations with variation in the speed of motion. This assembly of wheels 105 and 106 is connected to a very strong arm 112 that allows the folding of the retractable wheel assembly 100. In an example, retractable wheel assembly 100 can be opened by removing the outer sheet, in order to repair a flat tire.

Figure 4A:
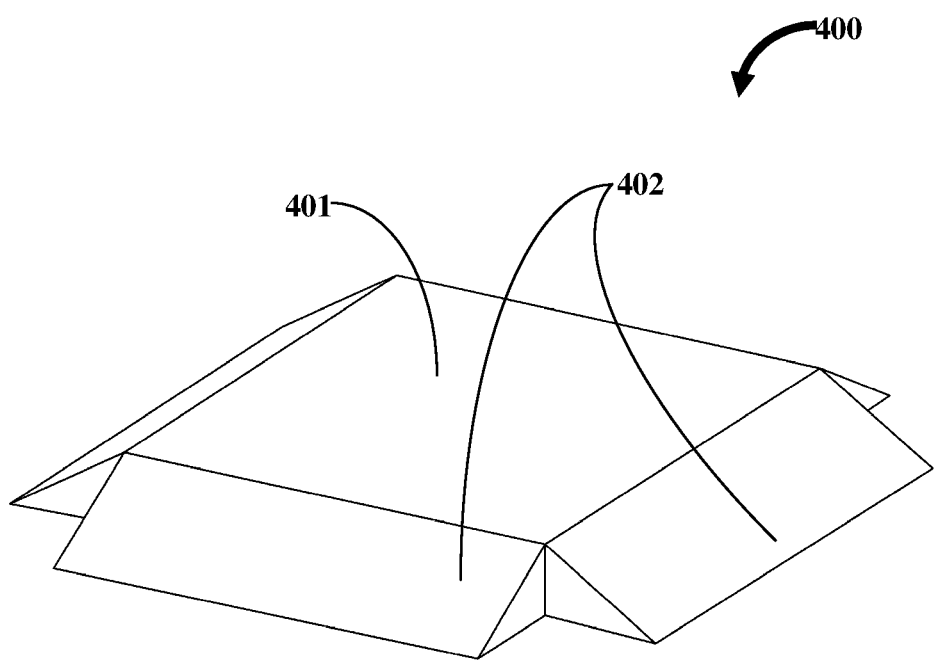
FIG. 4A exemplarily illustrates a top perspective view of a trailer box in an unfolded condition.
Figure 4B:
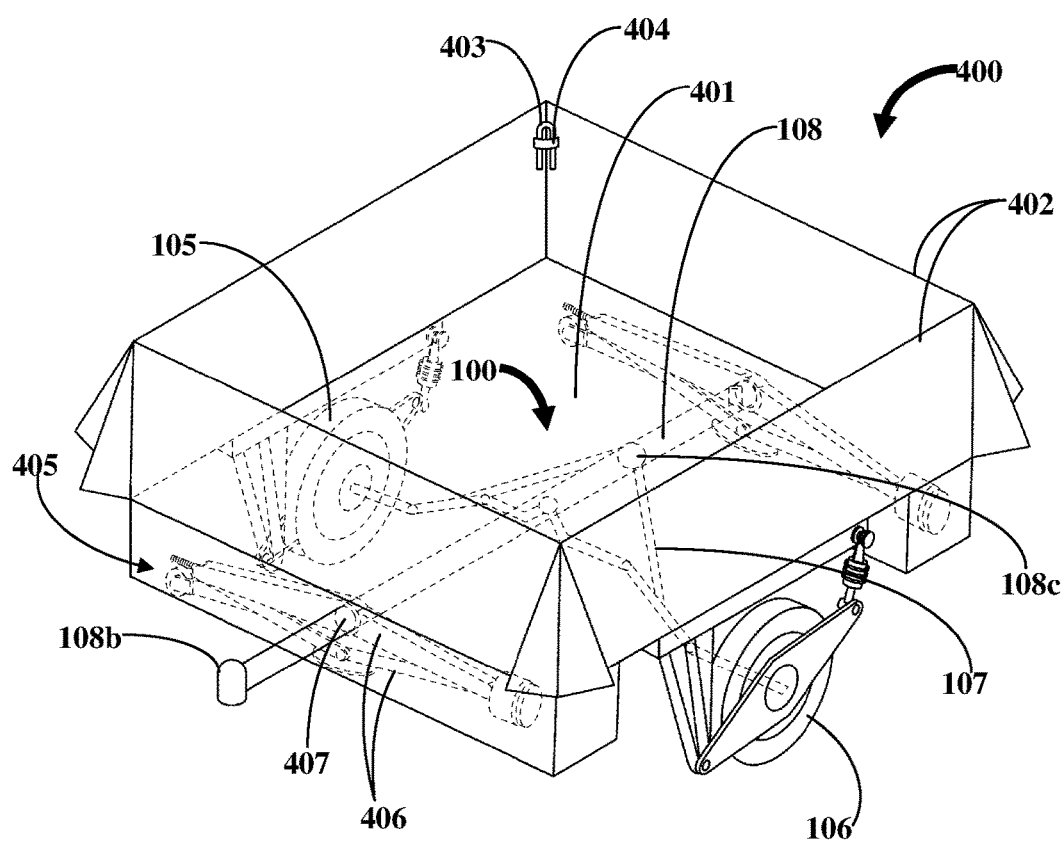
FIG. 4B exemplarily illustrates a top perspective view of a trailer box in a folded condition, showing the positioning and working of the retractable wheel assembly below the trailer box.

Referring to FIGS. 4A-4B, FIG. 4A exemplarily illustrates a top perspective view of a trailer box 400 in an unfolded condition, and FIG. 4B exemplarily illustrates a top perspective view of a trailer box 400 in a folded condition, showing the positioning and working of the retractable wheel assembly 100 below the trailer box 400. The foldable assembly of the trailer box 400 makes it easy to place the trailer box 400 underneath a car within a parking space, thereby avoiding consumption of extra space in a parking space that a regular trailer container would have consumed. In an example, the retractable wheel assembly 100 is configured to be fitted beneath a foldable trailer box 400 with an inner surface 401 and four side walls 402, as shown in FIG. 4A, in the deployed position. When the four side walls 402 are folded perpendicular to the inner surface 401, and clipped, the trailer box 400 is fully formed. The clipping of the adjacent side walls is performed via clips 403 which are inserted into respective slots 404 as shown in the FIG. 4B. Referring to FIG. 4B, the retractable wheel assembly 100 is positioned below the trailer box 400 and the retractable wheel assembly 100 comprises the pair of wheels 105 and 106 which are configured to be folded or unfolded according to the purpose. The wheels 105 and 106 are in a horizontal position after being fully unfolded and the retraction arms 107 are hinged together at a hinge section 108c common to a threaded shaft 108. The threaded shaft 108 extends outwardly as a towing end 108b for attaching a motor vehicle.

The trailer box 400 further comprises a jack assembly 405 attached below the trailer box 400. The jack assembly 400 is configured to elevate the trailer box 400 to a predefined height. The jack assembly 405 in general, for example, is driven by a motor with a spindle, so that the motor rotation will entail the rotation of the spindle and thus folds or extends the jack assembly 405 to a completely lowered down position or raised up position of the trailer box 400. To maintain stability during lifting of such trailer box 400, the jack assembly 405 comprises bars 406 with support rollers on the floor, one facing forward and the other backward, so that in the deployed condition, these support rollers stable maintenance of the trailer box 400 during lifting.

The joint 407 positioned on the upper bar 406 of jack assembly 405 constitutes a passage for the threaded shaft 108. In operation, when a user a vehicles pulls the towing end 108b of the threaded shaft 108, the jack assembly 405 expands and raises the trailer box 400 to a desired height. Simultaneously, since the threaded shaft 108 passes through the hinge section 108c of the retractable wheel assembly 100, the retractable wheel assembly 100 is also unfolded to deploy the wheels 105 and 106 downward, and put into operation, as explained in the embodiment of FIGS. 1A-1B. When the towing end is pulled inside, the jack assembly 405 is lowered, and simultaneously the wheels 105 and 106 of the retractable wheel assembly 100 are also folded, as explained in the embodiment of FIGS. 1A-1B.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

I claim:

1. A retractable wheel assembly, comprising:
   at least two arm assemblies hingedly attached to a lower frame of a utility vehicle, and symmetrically disposed along the lower frame, each arm assembly comprising;
   a first arm hingedly connected to the lower frame;
   a second arm hingedly linked to the first arm; and
   a third arm hingedly linked to the second arm;
   a pair of wheels, wherein each wheel is hingedly connected at distal ends of the third arm of each arm assembly, and hingedly connected to the lower frame;
   a retraction arm hingedly connected to the second arm, and a distal end of the retraction arm in hinged connection with an end of a threaded shaft, wherein the threaded shaft is centrally positioned between the two arm assemblies and perpendicular to the arm assemblies;
   the threaded shaft configured to be actuated in a rearward movement where the retraction arm is rearwardly pulled causing the second arm to unfold the arm assembly outwardly and deploy the wheels for motion of the utility vehicle, and further wherein the threaded shaft is configured to be actuated in a forward movement, where the retraction arm is pushed forward causing the second arm to fold the arm assembly inwardly and fold the wheels when the utility vehicle is positioned at rest.

2. The retractable wheel assembly of claim 1, wherein the wheels are configured to be extended across a predefined span via radially extending the arm assembly, wherein the predefined extension of the wheels stabilizes the utility vehicle.

3. The retractable wheel assembly of claim 1, wherein the first arm and third arm are spring loaded to thrust the arm assemblies during the folding of the wheels and unfolding of the wheels.

4. The retractable wheel assembly of claim 1, wherein the second arm moves at a higher speed than the first arm and the third arm to fold the first arm and second arm during operation.

5. The retractable wheel assembly of claim 1, wherein each retraction arm is rigidly held by the threaded shaft during operation, wherein the retraction arms prevents accidental folding of the arm assemblies connected to the wheels.

6. The retractable wheel assembly of claim 1, further comprising a guide way defined by a pair of guide blocks centrally positioned between the arm assemblies, wherein the threaded shaft is configured to traverse in the forward and the backward movement through the guide way.

7. The retractable wheel assembly of claim 1, wherein the guide blocks prevent a sudden impact movement of the arm assemblies during operation.

8. The retractable wheel assembly of claim 1, wherein the wheels are hingedly connected to the lower frame of the utility vehicle via a high strength arm frontally positioned to each wheel and a shock absorber arm rearwardly positioned to the wheels, to avoid vibrations of the arm assemblies during operation.

* * * * *